United States Patent [19]

Eoff

[11] Patent Number: 5,264,470
[45] Date of Patent: Nov. 23, 1993

[54] SET RETARDING ADDITIVES, CEMENT COMPOSITIONS AND METHODS

[75] Inventor: Larry Eoff, Duncan, Okla.

[73] Assignee: Halliburton Company, Duncan, Okla.

[21] Appl. No.: 998,308

[22] Filed: Dec. 30, 1992

[51] Int. Cl.$^5$ ................ C08K 3/00; C09K 7/00
[52] U.S. Cl. ............................. 524/4; 524/5; 523/130; 525/54.2; 525/54.3
[58] Field of Search ............ 524/4, 5; 523/130; 526/238.2, 238.23; 525/54.2, 54.3; 527/313, 314

[56] References Cited

U.S. PATENT DOCUMENTS 4,676,317  6/1987  Fry et al. .................. 166/293
4,703,801  11/1987 Fry et al. .................. 166/293
4,941,536  7/1990  Brothers et al. ........... 166/293

*Primary Examiner*—Paul R. Michl
*Assistant Examiner*—LaVonda DeWitt
*Attorney, Agent, or Firm*—Thomas R. Weaver; C. Clark Dougherty, Jr.

[57] ABSTRACT

The present invention provides set retarding additives, set retarded hydraulic cement compositions including such additives and methods of using the cement compositions for cementing zones in wells. The set retarding additives are graft polymers comprised of a backbone sugar having one or more pendant polymerized or co-polymerized vinyl compounds grafted thereto.

20 Claims, No Drawings

SET RETARDING ADDITIVES, CEMENT COMPOSITIONS AND METHODS

BACKGROUND OF THE INVENTION

1. Field of the Invention

The present invention relates generally to set retarding additives, hydraulic cement compositions containing the additives and methods of using the set retarded cement compositions for cementing subterranean zones in oil, gas and water wells.

2. Description of the Prior Art

Hydraulic cement compositions are used for carrying out various operations in oil, gas and water wells including, but not limited to construction and completion operations such as primary cementing and remedial operations such as squeeze cementing. Primary cementing involves the placement of a hydraulic cement composition into the annular space between the walls of a well bore and the exterior of a pipe such as casing disposed therein. The cement composition is pumped into the annular space and allowed to set into an annular cement sheath therein whereby the pipe is bonded to the walls of the well bore by the set cement.

Squeeze cementing techniques usually involve the undesirable movement of oil, gas or water through small holes or cracks in pipe disposed in the well bore; holes, cracks, voids or channels in the annular cement sheath between the pipe and the well bore; annular spaces between the cement sheath and the pipe or the walls of the well bore and permeable zones or fractures in subterranean formations. Such holes, cracks, etc. are plugged by squeezing hydraulic cement compositions therein which harden and form impermeable plugs.

In performing cementing operations in oil, gas and water wells, the cement compositions are often subjected to high temperatures, particularly when the cementing is carried out in deep subterranean zones. The high temperatures can cause premature setting of the cement compositions, i.e., the compositions can not be pumped for long enough times before setting to place them in the zones to be cemented. This requires the use of set retarding additives in the cement compositions which extend the setting times of the compositions so that adequate pumping time is provided in which to place or displace the compositions into desired subterranean zones.

While a variety of cement set retarding additives have heretofore been developed and utilized, the additives frequently produce erratic results in cement compositions of different component make-up and/or cause premature gelation of cement compositions in the hostile high temperature environments to which the cement compositions are subjected. The high temperatures referred to herein are temperatures up to 250° F. and higher, and the gelation referred to is the abnormal increase in viscosity of a cement composition without a significant increase in compressive strength. The increase in viscosity makes the cement composition difficult or impossible to pump even though the cement composition has not set. In addition, prior art set retarding additives comprised of materials such as lignosulfonates and synthetic polymers are often expensive to produce.

Thus, there is a need for improved cement set retarding additives, set retarding cement compositions and methods of cementing zones in oil, gas and water wells. In particular, there is a need for improved set retarding additives which are relatively inexpensive and bring about predictable cement composition setting times in the hostile subterranean environments encountered in wells.

SUMMARY OF THE INVENTION

The present invention provides improved set retarding additives, improved set retarded hydraulic cement compositions and improved methods of using such compositions which meet the needs described above and overcome the shortcomings of the prior art. The improved set retarding additives of this invention are basically comprised of graft polymers comprised of a backbone sugar having pendant polymerized vinyl compounds grafted thereto. The backbone sugars which are useful in forming the additives are those sugars having the following general formula:

$$A \left( \begin{array}{c} H \\ | \\ -C- \\ | \\ OH \end{array} \right)_m \left[ -D \left( \begin{array}{c} H \\ | \\ -C- \\ | \\ OH \end{array} \right)_n \right]_p B$$

wherein:

A is a group selected from

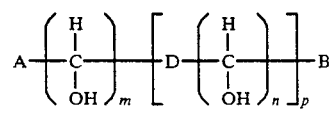

B is a group selected from

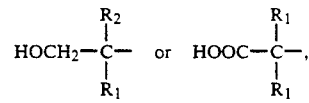

$R_1$ is selected from hydrogen, hydroxyl or $-CH_2OH$ and can be the same or different in the above A, B and D groups, $R_2$ is selected from hydrogen or oxygen, m is an integer in the range of from 1 to 3, n is an integer in the range of from 1 to 3, and p is an integer having a value of 0 or 1.

One or more vinyl compounds are polymerized and grafted to the sugar backbone. The preferred vinyl compounds for use as monomers in the polymerizations are selected from the group consisting of 2-acrylamido-2-methyl propane sulfonic acid, vinyl phosphonic acid, vinyl sulfonic acid, acrylic acid, acrylonitrile and N,N-dimethylacrylamide.

The improved set retarded hydraulic cement compositions of this invention are comprised of hydraulic cement, sufficient water to form a pumpable slurry and a set retarding additive as described above. The improved methods of the invention for cementing subterranean zones penetrated by well bores comprise the steps of forming a pumpable set retarded cement composition of the invention, pumping the cement composition into the subterranean zone to be cemented by way of the well bore and allowing the cement composition to set therein.

It is, therefore, a general object of the present invention to provide improved cement set retarding additives, set retarded hydraulic cement compositions and methods of using such compositions in well cementing.

Other and further objects, features and advantages of the present invention will be readily apparent to those skilled in the art upon a reading of the description of preferred embodiments which follows.

DESCRIPTION OF PREFERRED EMBODIMENTS

The improved set retarding additives of this invention are synthetic additives which are relatively inexpensive as compared to many of the prior art set retarders and are effective in retarding the set of cement compositions at high temperatures. The set retarding additives are basically comprised of graft polymers formed of a backbone sugar having pendant polymerized or copolymerized vinyl compounds grafted thereto.

The sugars which are useful in forming the graft polymers are those defined by the following general formula:

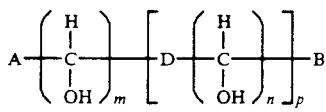

wherein:
A is a group selected from

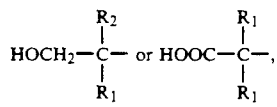

B is a group selected from

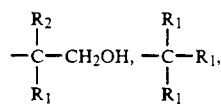

$R_1$ is selected from hydrogen, hydroxyl or —$CH_2OH$ and can be the same or different in the above A, B and D groups, $R_2$ is selected from hydrogen or oxygen, m is an integer in the range of from 1 to 3, n is an integer in the range of from 1 to 3, and p is an integer having a value of 0 or 1.

The one or more vinyl compounds which are polymerized or copolymerized and grafted to a backbone sugar as defined above to form a set retarding additive of this invention are selected from the group consisting of 2-acrylamido-2-methyl propane sulfonic acid, vinyl phosphonic acid, vinyl sulfonic acid, acrylic acid, acrylonitrile and N,N-dimethylacrylamide.

Examples of backbone sugars within the above general formula are fructose, glucose, sucrose, sorbitol, gluconic acid, tartaric acid, maltose, lactose and cellobiose. Of these, sorbitol, gluconic acid and tartaric acid are preferred with gluconic acid being the most preferred.

Of the various vinyl compounds set forth above, one or more of acrylic acid, 2-acrylamido-2-methyl propane sulfonic acid and vinyl phosphonic acid are preferably utilized with acrylic acid being the most preferred.

The graft polymer set retarding additive is typically formed by dissolving the backbone sugar compound and one or more vinyl compounds to be polymerized and grafted thereto in a suitable solvent such as water, and heating the solution to a reaction temperature in the range of from about 30° C. to about 90° C. A suitable radical initiator is then added to the solution, e.g., sodium persulfate, which starts the grafting reaction. That is, once a radical is formed on a hydroxyl group of the sugar backbone, it reacts with the vinyl compound or compounds and begins a polymerization reaction. Theoretically, polymerizations of the vinyl compounds can initiate at all of the hydroxyl sites of the sugar compound. As will be understood, the sequence of addition of the backbone sugar, the initiator and the vinyl compound or compounds utilized can be varied. For example, the backbone sugar and initiator can be dissolved together in a heated solvent followed by the slow addition of the vinyl compound or compounds. After the grafting reaction has taken place, the resulting graft polymer is separated from the solvent utilizing conventional techniques and dried.

Generally, the graft polymers useful in accordance with the present invention are comprised of monosaccharide or disaccharide backbone sugars having pendant polymerized or copolymerized vinyl compounds grafted thereto whereby the resulting graft polymer has a molecular weight in the range of from about 1000 to about 15,000. Also, the graft polymers preferably have a weight ratio of the backbone sugar to the pendant polymerized vinyl compounds in the range of from about 30:70 to about 70:30, most preferably about 55:45.

Particularly suitable set retarding additives of the present invention are comprised of a backbone sugar selected from sorbitol, gluconic acid and tartaric acid having pendant polymerized vinyl compounds selected from the group consisting of acrylic acid, 2-acrylamido-2-methyl propane sulfonic acid and vinyl phosphonic acid grafted thereto. The most preferred backbone sugar is gluconic acid and the most preferred vinyl compounds are acrylic acid and 2-acrylamido-2-methyl propane sulfonic acid. The most preferred set retarding additive of the present invention is comprised of a gluconic acid backbone sugar having acrylic acid and 2-acrylamido-2-methyl propane sulfonic acid pendant polymerized vinyl compounds grafted thereto, having a molecular weight in the range of from about 1000 to about 15,000 and having a weight ratio of the backbone sugar to the pendant polymerized vinyl compounds of about 55:45.

The set retarded hydraulic cement compositions of this invention are basically comprised of a hydraulic cement, sufficient water to form a pumpable slurry of the cement and a graft polymer set retarding additive as described above. While various hydraulic cements can be utilized in the cement compositions, Portland cement is generally preferred, and can be, for example, one or more of the various types identified as API Classes A—H and J cements. These cements are classified and defined in API Specification for Materials and Testing for Well Cements, API Spec. 10A, 21st Edition dated Sep. 1, 1991 of the American Petroleum Institute, Washington, D.C. A highly useful and effective cement slurry base for use in accordance with this invention comprises API Class H Portland cement mixed with water to provide a density of from about 11.3 to about 18.0 pounds per gallon.

The water used in the cement compositions can be water from any source, provided that the water does not contain an excess of compounds which adversely react with or otherwise affect other components in the cement compositions. The water is present in a cement composition of this invention in an amount sufficient to form a slurry of the cement, preferably a slurry which is readily pumpable. Generally, the water is present in the range of from about 30% to about 60% by weight of dry cement in the composition.

A set retarding additive of this invention as described above is included in the cement compositions of the invention in an amount sufficient to delay or retard the setting of the compositions for time periods required to place the compositions in desired locations. When the cement compositions are utilized to perform completion, remedial and other cementing operations in subterranean zones penetrated by well bores, the compositions have to remain pumpable for periods of time sufficient to place them in the subterranean zones to be cemented. Generally, a particulate solid set retarding graft polymer of this invention or an aqueous solution containing the graft polymer is combined with a cement slurry in an amount whereby the graft polymer is present in the resulting set retarded cement composition in an amount in the range of from about 0.1% to about 2% by weight of dry cement in the composition.

The thickening and set times of cement compositions are strongly dependant upon temperature, and to obtain optimum results, the quantity of the graft polymer set retarding additive of this invention required to provide the necessary pumping time at the temperatures to be encountered is included in the cement composition to be utilized. Such quantity can be determined in advance by performing API thickening time tests.

A variety of other additives are often included in cement compositions in addition to the set retarding additives described above. Such additives are well known to those skilled in the art and are included in cement compositions to vary the composition density, increase or decrease strength, control fluid loss, reduce viscosity, increase resistance to corrosive fluids, and the like. Essentially, a cement composition meeting the specifications of the American Petroleum Institute is mixed with water and other additives to provide a cement slurry suitable and appropriate for the conditions existing in each individual well to be cemented.

A particularly preferred set retarded cement composition of this invention is comprised of API Class H Portland cement, water in an amount sufficient to form a pumpable slurry, i.e., an amount in the range of from about 30% to about 60% by weight of dry cement in the composition and a graft polymer set retarding additive present in the composition in an amount in the range of from about 0.1% to about 2% by weight of dry cement therein, the graft polymer set retarding additive being comprised of a gluconic acid backbone sugar having grafted thereto pendant copolymerized acrylic acid and 2-acrylamido-2methyl propane sulfonic acid vinyl compounds wherein the weight ratio of the backbone sugar to the pendant copolymerized vinyl compounds is in the range of from about 30:70 to about 70:30 and the polymer has a molecular weight in the range of from about 1000 to about 15,000.

The methods of cementing a subterranean zone penetrated by a well bore of this invention are basically comprised of the steps of forming a pumpable set retarded cement composition of the invention, pumping the cement composition into the subterranean zone by way of the well bore and then allowing the cement composition to set therein.

In order to further describe the set retarding additives, cement compositions and methods of this invention and to facilitate a clear understanding thereof, the following examples are given.

EXAMPLE 1

Various set retarding additives of the present invention were each prepared using the following general procedure. The backbone sugar and vinyl compounds utilized as shown in Table I below were dissolved in fresh water in the amounts given in Table I. The reaction mixture was then heated to reaction temperature and a radical initiator was added to the reaction mixture. The grafting and polymerization reaction was allowed to proceed for a time period whereby a graft polymer having a molecular weight in the range of from about 1000 to about 15,000 was produced.

TABLE I

SET RETARDING ADDITIVES

| Set Retarder Sample No. | Backbone Sugar Used | Quantity of Backbone Sugar Used, grams | Vinyl Compounds Used and Quantities Thereof | | Weight Ratio of Sugar to Vinyl Compounds in Resulting Graft Polymers |
|---|---|---|---|---|---|
| | | | AMPS ®,[1] grams | Acrylic Acid, grams | |
| 1 | Sorbitol | 10.0 | 1.2 | 6.3 | 57:43 |
| 2 | Sorbitol | 10.0 | 1.6 | 7.8 | 52:48 |
| 3 | Sorbitol | 10.0 | 1.2 | 6.3 | 57:43 |
| 4 | Gluconic Acid | 10.0 | 1.2 | 6.3 | 57:43 |
| 5 | Gluconic Acid | 10.0 | 1.2 | 6.3 | 57:43 |
| 6 | Gluconic Acid | 10.0 | 6.2 | 12.4 | 35:65 |
| 7 | Sorbitol | 10.0 | 6.2 | 12.4 | 35:65 |
| 8 | Gluconic Acid | 10.0 | 1.2 | 6.3 | 57:43 |
| 9 | Sorbitol[2] | 10.0 | 3.0 | 9.0 | 45:55 |

[1] 2-acrylamido-2-methylpropane sulfonic acid. AMPS ® is a registered trademark of the Lubrizol Corporation.
[2] Contained trace amount of allyl glycidyl ether.

EXAMPLE 2

Various quantities of some of the set retarding additives produced in Example 1 and described in Table I were added to test samples of a base cement slurry. For comparison purposes, various quantities of a commercially available set retarding additive were also added to test samples of the cement slurry. The base cement slurry was comprised of Capital Class H cement and water in an amount of 4.3 gallons per 94 pound sack of cement, and the slurry had a density of 16.4 pounds per gallon.

The test cement composition samples containing various quantities of the set retarding additives were tested for thickening times at various temperatures in accordance with the standard API thickening time testing procedures set forth in the American Petroleum Institute publication referred to above, i.e., API Specification 10A. The results of these tests are set forth in Table II below.

TABLE II

| Set Retarder Used | Quantity of Set Retarder in Basic Cement Composition, % by Weight of Dry Cement | Thickening Times, hr:min | | |
|---|---|---|---|---|
| | | 392° F. | 302° F. | 200° F. |
| HR ®-15[1] | 1.3 | — | 4:15 | — |
| HR-15[1] | 2.0 | 2:11 | — | — |
| 1[2] | 0.8 | — | — | 2:50 |
| 1 | 1.3[3] | — | 1:24 | — |
| 1 | 2.0 | 1:08 | 1:21 | — |
| 2[2] | 0.8 | — | — | 0:34 |
| 2 | 1.3 | — | 0:35 | — |
| 2 | 2.0 | 0:30 | — | — |
| 3[2] | 0.8 | — | — | 0:35 |
| 3 | 1.3 | — | 0:36 | — |
| 3 | 2.0 | 0:37 | — | — |

[1]A set retarder comprised of a mixture of lignosulfonate and tartaric acid, approximately 3 parts lignosulfonate to 1 part tartaric acid by weight. The set retarder is commercially available from the Halliburton Company of Duncan, Oklahoma.
[2]These numbers refer to the Sample Numbers set forth in Table I above.
[3]The API 24 hour compressive strength of cured sample was 2600 psi.

EXAMPLE 3

Additional cement compositions containing set retarding additives described in Table I were tested for thickening times. Cement compositions containing a commercially available set retarder were also tested for comparison purposes. In addition, the cement compositions were tested for gelation by determining the viscosities of the compositions initially and at 25%, 50% and 75% of the thickening time. The results of these tests are set forth in Table III below.

TABLE III

Thickening Time and Gelation Tests

| Set Retarder Used | Quantity of Set Retarder in Basic Cement Composition, % by Weight of Dry Cement | 250° F. Thickening Time, hr:min | Initial Viscosity, $B_c$ | Viscosity at 25% of Thickening Time, $B_c$ | Viscosity at 50% of Thickening Time, $B_c$ | Viscosity at 75% of Thickening Time, $B_c$ |
|---|---|---|---|---|---|---|
| HR ®-12 | 1.3 | 2:17 | 5 | 4 | 4 | 4 |
| HR ®-12 | 1.8 | 5:46 | — | — | — | — |
| 4[2] | 1.3 | 7:17 | 5 | 3 | 50 | 27 |
| 5[2] | 1.3 | 1.38 | 18 | 19 | 30 | 44 |
| 5 | 2.0 | 1:09 | 5 | 9 | 9 | 9 |
| 6[2] | 1.3 | 2:09 | 1 | 15 | 35 | 46 |
| 7[2] | 1.3 | 2:15 | 13 | 4 | 4 | 4 |
| 7 | 1.8 | 2:50 | 10 | 13 | 13 | 13 |
| 8[2] | 1.3 | 3:30 | 34 | 17 | 15 | 45 |
| 9[2] | 1.3 | 1:03 | 10 | 10 | 10 | 10 |

[1]A set retarder comprised of a mixture of lignosulfonate and gluconic acid, approximately 3 parts lignosulfonate to 1 part gluconic acid by weight.
[2]These numbers refer to the Sample Numbers set forth in Table I above.

From Table III it can be seen that the graft polymers of this invention are effective set retarding additives for well cement compositions. While some of the additives cause some gelation, others do not.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A graft polymer additive for retarding the set of a hydraulic cement composition comprised of:

a backbone sugar having the general formula:

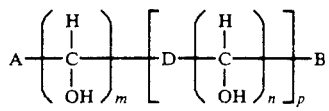

wherein:

A is a group selected from

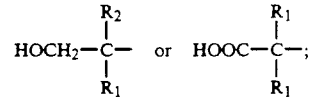

B is a group selected from

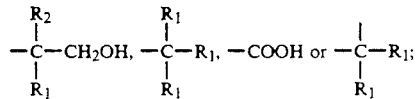

D is 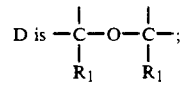

$R_1$ is selected from hydrogen, hydroxyl or —CH$_2$OH and can be the same or different in the above A, B and D groups;
$R_2$ is selected from hydrogen or oxygen;
m is an integer in the range of from 1 to 3;
n is an integer in the range of from 1 to 3; and
p is an integer having a value of 0 or 1;
said backbone sugar having grafted thereto one or more pendant polymerized or copolymerized vinyl compounds selected from the group consisting of 2-acrylamido-2-methyl propane sulfonic acid, vinyl phosphonic acid, vinyl sulfonic acid, acrylic acid, acrylonitrile and N,N-dimethylacrylamide.

2. The additive of claim 1 wherein the weight ratio of said backbone sugar to said one or more pendant polymerized or copolymerized vinyl compounds is in the range of from about 30:70 to about 70:30.

3. The additive of claim 2 wherein said backbone sugar is selected from the group consisting of sorbitol, gluconic acid and tartaric acid and said one or more vinyl compounds are selected from the group consisting of acrylic acid, 2-acrylamido-2-methyl propane sulfonic acid and vinyl phosphonic acid.

4. The additive of claim 2 wherein said backbone sugar is gluconic acid and said one or more vinyl compounds are selected from acrylic acid and 2-acrylamido-2-methyl propane sulfonic acid.

5. The additive of claim 2 wherein said backbone sugar is sorbitol and said one or more vinyl compounds are selected from acrylic acid and 2-acrylamido-2-methyl propane sulfonic acid.

6. The additive of claim 2 wherein said backbone sugar is gluconic acid, said vinyl compounds are acrylic acid and 2-acrylamido-2-methyl propane sulfonic acid and the weight ratio of said backbone sugar to said pendant copolymerized vinyl compounds is 55:45.

7. A set retarded hydraulic cement composition comprising:
    hydraulic cement;
    sufficient water to form a pumpable slurry; and
    a graft polymer set retarding additive comprised of a backbone sugar having the general formula:

$$A-\left(\begin{array}{c}H\\|\\C\\|\\OH\end{array}\right)_m\left[-D-\left(\begin{array}{c}H\\|\\C\\|\\OH\end{array}\right)_n\right]_p-B$$

wherein:
A is a group selected from

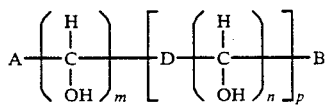

B is a group selected from

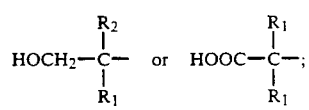

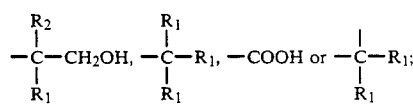

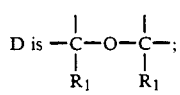

$R_1$ is selected from hydrogen, hydroxyl or —$CH_2OH$ and can be the same or different in the above A, B and D groups;
$R_2$ is selected from hydrogen or oxygen;
m is an integer in the range of from 1 to 3;
n is an integer in the range of from 1 to 3; and
p is an integer having a value of 0 or 1;
said backbone sugar having grafted thereto one or more pendant polymerized or copolymerized vinyl compounds selected from the group consisting of 2-acrylamido-2-methyl propane sulfonic acid, vinyl phosphonic acid, vinyl sulfonic acid, acrylic acid, acrylonitrile and N,N-dimethylacrylamide. vinyl sulfonic acid, acrylic acid, acrylonitrile and N,N-dimethylacrylamide.

8. The composition of claim 7 wherein the weight ratio of said backbone sugar to said one or more pendant polymerized or copolymerized vinyl compounds is in the range of from about 30:70 to about 70:30.

9. The composition of claim 8 wherein said backbone sugar is selected from the group consisting of sorbitol, gluconic acid and tartaric acid and said one or more vinyl groups are selected from the group consisting of acrylic acid, 2-acrylamido-2-methyl propane sulfonic acid and vinyl phosphonic acid.

10. The composition of claim 8 wherein said backbone sugar is gluconic acid and said one or more vinyl compounds are selected from acrylic acid and 2-acrylamido-2-methyl propane sulfonic acid.

11. The composition of claim 8 wherein said backbone sugar is sorbitol and said one or more vinyl compounds are selected from acrylic acid and 2-acrylamido-2-methyl propane sulfonic acid.

12. The composition of claim 8 wherein said backbone sugar is gluconic acid, said vinyl compounds are acrylic acid and 2-acrylamido-2-methyl propane sulfonic acid and the weight ratio of said backbone sugar to said pendant copolymerized vinyl compounds is 55:45.

13. The composition of claim wherein said set retarding additive is present in said composition in an amount in the range of from about 0.1% to about 2% by weight of dry cement therein.

14. A method of cementing a subterranean zone penetrated by a well bore comprising the steps of:
    forming a pumpable set retarded cement composition comprised of hydraulic cement, sufficient water to form a pumpable slurry and a graft polymer set retarding additive comprised of a backbone sugar having the general formula:

$$A-\left(\begin{array}{c}H\\|\\C\\|\\OH\end{array}\right)_m\left[-D-\left(\begin{array}{c}H\\|\\C\\|\\OH\end{array}\right)_n\right]_p-B$$

wherein:
A is a group selected from

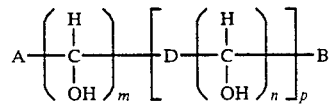

B is a group selected from

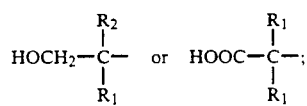

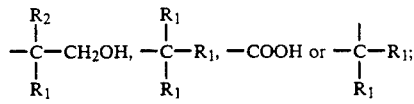

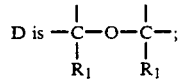

$R_1$ is selected from hydrogen, hydroxyl or $CH_2OH$ and can be the same or different in the above A, B and D groups;
$R_2$ is selected from hydrogen or oxygen;
m is an integer in the range of from 1 to 3;
n is an integer in the range of from 1 to 3; and
p is an integer having a value of 0 or 1;
said backbone sugar having grafted thereto one or more pendant polymerized or copolymerized vinyl compounds selected from the group consisting of 2-acrylamido-2-methyl propane sulfonic acid, vinyl phosphonic acid, vinyl sulfonic acid, acrylic acid, acrylonitrile and N,N-dimethylacrylamide.

15. The method of claim 14 wherein the weight ratio of said backbone sugar to said one or more pendant polymerized or copolymerized vinyl compounds is in the range of from about 30:70 to about 70:30.

16. The method of claim 15 wherein said backbone sugar is selected from the group consisting of sorbitol, gluconic acid and tartaric acid and said one or more vinyl groups are selected from the group consisting of acrylic acid, 2-acrylamido-2-methyl propane sulfonic acid and vinyl phosphonic acid.

17. The method of claim 15 wherein said backbone sugar is gluconic acid and said one or more vinyl compounds are selected from acrylic acid and 2-acrylamido-2-methyl propane sulfonic acid.

18. The method of claim 15 wherein said backbone sugar is sorbitol and said one or more vinyl compounds are selected from acrylic acid and 2-acrylamido-2-methyl propane sulfonic acid.

19. The method of claim 15 wherein said backbone sugar is gluconic acid, said vinyl compounds are acrylic acid and 2-acrylamido-2-methyl propane sulfonic acid and the weight ratio of said backbone sugar to said pendant copolymerized vinyl compounds is 55:45.

20. The method of claim 15 wherein said set retarding additive is present in said composition in an amount in the range of from about 0.1% to about 2% by weight of dry cement therein.

* * * * *